United States Patent
Woo

(10) Patent No.: US 8,979,046 B2
(45) Date of Patent: Mar. 17, 2015

(54) VACUUM ADSORBING DEVICE

(76) Inventor: Chul Seok Woo, Seoul (KR)

(*) Notice: Subject to any disclaimer, the term of this patent is extended or adjusted under 35 U.S.C. 154(b) by 162 days.

(21) Appl. No.: 13/704,036

(22) PCT Filed: Nov. 16, 2010

(86) PCT No.: PCT/KR2010/008112
§ 371 (c)(1), (2), (4) Date: Dec. 13, 2012

(87) PCT Pub. No.: WO2012/067280
PCT Pub. Date: May 24, 2012

(65) Prior Publication Data
US 2013/0082154 A1  Apr. 4, 2013

(51) Int. Cl.
*A45D 42/14* (2006.01)
*A47B 97/00* (2006.01)
(Continued)

(52) U.S. Cl.
CPC ............... *F16M 13/02* (2013.01); *F16B 47/00* (2013.01); *F16M 13/022* (2013.01)
USPC ..... 248/205.5; 248/683; 248/537; 248/205.6; 248/205.7; 248/205.8; 248/205.9; 248/206.1; 248/206.2; 248/309.3; 248/362; 248/363; 269/21; 40/597

(58) Field of Classification Search
CPC .............. F16B 47/00; F16B 47/006; B60R 2011/0056; B60R 2011/0066; A47G 1/17
USPC ............... 248/205.5, 683, 537, 205.6, 205.7, 248/205.8, 205.9, 206.1, 206.2, 309.3, 362, 248/363; 269/21; 40/597
See application file for complete search history.

(56) References Cited

U.S. PATENT DOCUMENTS 5,087,005 A * 2/1992 Holoff et al. ............... 248/205.8
6,932,306 B2 * 8/2005 Zou et al. .................... 248/205.5
(Continued)

FOREIGN PATENT DOCUMENTS

JP 07-030775 1/1995
KR 10-2005-0102807 10/2005
(Continued)

OTHER PUBLICATIONS

International Search Report for PCT/KR2010/008112 Mailed on August 10, 2011.

*Primary Examiner* — Christopher Garft
(74) *Attorney, Agent, or Firm* — Andrus Intellectual Property Law, LLP

(57) ABSTRACT

A vacuum suction device of the present invention comprises: a cover which is rotatably mounted on the upper portion so as to couple to a flat surface by means of vacuum suction; an suction plate, which is coupled to the lower portion of the cover, for vacuum suction to the flat surface; and a height adjustment member, which is arranged between the cover and the suction plate, for moving the suction plate back and forth according to the rotation of the cover; wherein a plurality of fixing pieces are formed on the upper surface of the inside of the cover, a plurality of elastic stoppers are coupled to the inside of the height adjustment member, so as to be movable by sliding when each of the fixing pieces is in contact, and for fixing the cover by each of the fixing pieces being hooked to the end portion of the cover so as to prevent reverse rotation. The vacuum suction device of the present invention enhances suction force so as to couple the vacuum suction device to the flat surface more solidly and for a longer time, enhances assembly between each of the elements for vacuum suction, and prevents unlocking due to outside shock by forming a double locking structure in the vacuum adsorption device.

6 Claims, 5 Drawing Sheets

(51) Int. Cl.
*B25B 11/00* (2006.01)
*F16M 13/02* (2006.01)
*F16B 47/00* (2006.01)

(56) References Cited

U.S. PATENT DOCUMENTS

| | | | | |
|---|---|---|---|---|
| 6,966,530 | B2 * | 11/2005 | Hsu | 248/206.2 |
| 7,243,806 | B2 * | 7/2007 | Kwok | 211/105.3 |
| 7,708,245 | B2 * | 5/2010 | Woo | 248/205.7 |
| 8,333,354 | B2 * | 12/2012 | Tooley et al. | 248/206.2 |
| 2009/0121102 | A1 * | 5/2009 | Woo | 248/205.7 |
| 2010/0252700 | A1 * | 10/2010 | Wang | 248/206.2 |

FOREIGN PATENT DOCUMENTS

| | | |
|---|---|---|
| KR | 20-0420964 | 6/2006 |
| KR | 10-0786816 | 12/2007 |
| KR | 20-2008-002917 | 7/2008 |
| KR | 10-2009-0095310 | 9/2009 |
| KR | 10-2011-0035205 | 4/2011 |

* cited by examiner

VACUUM ADSORBING DEVICE

RELATED APPLICATIONS

This application is a 371 application of International Application No. PCT/KR2010/008112, filed Nov. 16, 2010, which is incorporated herein by reference in its entirety.

TECHNICAL FIELD

The present invention relates to a vacuum suction device including a hanging member in order for a towel, toilet paper or the like to be hung on the hanging member, and more particularly, to a vacuum suction device, which enhances suction force so as to be coupled to a flat surface by means of vacuum suction more solidly and for a longer time, and enhances an assembling work between each of the elements configuring the vacuum suction device.

BACKGROUND ART

Generally, a vacuum suction device is a member which is adhered to a surface by means of vacuum suction in order for objects of various shapes such as a towel or toilet paper rack to be hung on a flat surface such as a glass or tile surface.

The vacuum suction device includes a hanging member and a suction plate, the hanging member is formed for a towel or toilet paper rack to be hung on the hanging member, and the suction plate is adhered to a smooth surface or a flat surface such as a glass or tile surface by means of vacuum suction.

In other words, if the vacuum suction device is, pushed to an adhered surface when the suction plate is being brought into contact with a smooth surface or a flat surface, that is, the adhered surface, air between the adhered surface and the suction plate gets out, and thus, the state of a space between the adhered surface and the suction plate is changed to a vacuum-applied state, whereupon the suction plate is sucked by the adhered surface, thereby fixing the vacuum suction device.

The suction plate may be adhered to the adhered surface by directly pushing the suction plate of the vacuum suction device to the adhered surface, or the suction plate may be adhered to the adhered surface by using another member for keeping a sucking state of the vacuum suction device.

Here, it is difficult that the vacuum suction device, which directly pushes the suction plate to the adhered surface to adhere the suction plate to the adhered surface, seals a space between the suction plate and the adhered surface, and suction force of the vacuum suction device between the suction plate and the adhered surface is weak. Therefore, the suction plate is easily separated from the adhered surface, and thus, it is difficult for the vacuum device to be fixed to the adhered surface for a long time, and the vacuum suction device separated from the adhered surface has to be repeatedly adhered to the adhered surface, and thus, it is inconvenient to use the vacuum suction device.

A vacuum suction device, which adheres a suction plate to an adhered surface by using another member, according to Korean Utility Model Registration No 0420964, applied and registered by this applicant, includes a cover, a height adjustment member and a suction plate, and if the cover is rotated clockwise, a spring is wound and at the same time, a height adjustment protrusion formed inside the cover moves along a height-adjustment inclined surface, and thus, the cover is lifted by a step height, and at this point, if the height adjustment member is inserted into a height-adjustment protrusion fixing groove, the spring maintains a wound state.

Therefore, a center part of the suction plate is lifted and an outer surface of the suction plate is tightly contacting an adhered surface, and thus, a state between the adhered surface and the suction plate is changed to a vacuum-applied state, whereupon the suction plate is adhered to the adhered surface.

Here, the spring always starts at an initial point to make a maximum vacuum suction force when vacuum suction is performed, and the height adjustment protrusion is fixed to the height-adjustment protrusion fixing groove so as to prevent the spring from being unwound.

Also, if the height adjustment protrusion is separated from the height-adjustment protrusion fixing groove by rotating the cover counterclockwise, the spring is unwound by an elastic restoring force of the spring for returning to the initial point, that is, an original position, and thus, because a vacuum-applied state between the adhered surface and the suction plate is released, the suction plate is separated from the adhered surface.

However, in the related art vacuum suction device, if the cover is rotated clockwise by using an elastic restoring force, the spring is wound, and at the same time, is moved to the adhered surface of the suction plate by the height adjustment member, and thus, the center part of the suction plate is lifted from the adhered surface and a vacuum-applied state is formed, whereupon the suction plate is adhered to the adhered surface. If the cover is rotated counterclockwise, the height adjustment protrusion is separated from the height-adjustment protrusion fixing groove, the vacuum-applied state is released by an elastic restoring force of the spring, the elastic restoring force making the spring restored to the initial point, and thus, the suction plate is separated from the adhered surface.

Because It is very inconvenient to assemble or combine the spring, which effectuates the suction plate being adhered to the adhered surface by forming the vacuum-applied state between the adhered surface and the suction plate by using the elastic restoring force of the spring, or making the suction plate separated from the adhered surface by releasing the vacuum-applied state between the adhered surface and the suction plate, to the vacuum suction device, a work efficiency is degraded, and because the cost of the spring is relatively high, a manufacturing cost increases.

Moreover, if the spring is used for a long time, an elastic force is degraded, and thus, a performance of the vacuum suction device is degraded, and because the spring, an elastic force of which is degraded, has to be replaced after the vacuum suction device is disassembled, a replacement is very inconvenient, and a replacement cost increases.

Also, because the cover coupled to the spring has to be rotated several times in the course of the initial assembly of every element configuring the vacuum suction device so as to generate an elastic force of the spring, unnecessary work has to be added, and thus, work efficiency is degraded, and work for combining the cover and the spring is inconvenient.

Furthermore, when the height adjusting protrusion formed in the cover of the vacuum suction device moves along a height-adjustment inclined surface of the height adjustment member to be inserted into the height-adjustment protrusion fixing groove, and the suction plate is adhered to the adhered surface, if the vacuum suction device is given an outer shock, the height adjustment protrusion is separated from the height-adjustment protrusion fixing groove. At the same time, a rotation of the cover of the vacuum suction device to an original position by a restoring force of the spring for returning to an original position may occur, and thus, a vacuum-applied state between the adhered surface and the suction plated is released, whereupon the suction plate is separated from the adhered surface, and thus, the vacuum suction device is so easily separated.

DISCLOSURE OF INVENTION

Accordingly, the present invention is directed to a vacuum suction device, which substantially obviates one or more problems due to limitations and disadvantages of the related art. An aspect of the present invention is directed to provide a vacuum suction device, which includes a plurality of fixing pieces formed inside a cover of the vacuum suction device, and a height adjustment member in which a plurality of elastic stoppers having a certain curved surface are formed, which enhances a suction force by moving the fixing piece along the curved surface of the elastic stopper with the fixing piece contacting the curved surface depending on a rotation of the cover to be hung on one side of the elastic stopper, and makes a suction plate of the vacuum suction device tightly contact an adhered surface to be securely adhered to the adhered surface. This enhances an efficiency of an assembly by making an assembly of every element be easily performed.

Another aspect of the present invention is directed to providing a vacuum suction device, which makes the suction plate be securely adhering to the adhered surface and prevents the suction plate from being easily unwound due to an outer shock by moving each of the fixing pieces formed in the cover along the curved surface of each of the elastic stoppers to be hung on a bent surface, moving each of stop protrusion parts of the cover along an inclined surface formed in a side plate of the height adjustment member to be inserted into each of fixing groove parts to be hung to form a double lock structure.

The other aspect of the present invention is directed to provide a vacuum suction device including an elastic stopper performing two functions, one of which restores a position to an original position, the function being performed by a conventional spring, and the other of which makes a fixing piece be fixed to a bent surface of the elastic stopper one more again.

To chieve these and other advantages and in accordance with the purpose of the invention, as embodied and broadly described herein, there is provided a vacuum suction device, which comprises: a cover which is rotatabiy mounted on an upper portion so as to be coupled to a flat surface by vacuum suction; a suction plate which is coupled to a lower portion of the cover to be sucked by vacuum to the flat surface; and a height adjustment member which is arranged between the cover and the suction plate to move the suction plate upward and downward according to the rotation of the cover, wherein a plurality of fixing pieces are formed in a top surface of inside the cover, and a plurality of elastic stoppers having a certain elastic force are coupled to inside the height adjustment member in order for the each of the fixing pieces to move by sliding with the fixing piece contacting the elastic stopper and in order for the each of the fixing pieces to be hung on an end portion to fix the cover so as to prevent a backward rotation of the cover from occurring.

In the present invention, the each of the fixing pieces of the cover is bent to be formed into a 'V' shape, and a bent outer surface of the each of the fixing pieces is formed into a round shape.

In the present invention, one coupling surface or a plurality of coupling surfaces are formed in the other side of the each of the elastic stoppers, a bent surface is formed in one side of the each of the elastic stoppers in order for the each of the fixing pieces to be hung on the bent surface to be fixed, and a curved surface, which the each of the fixing pieces contact to slide, is formed to be curved at a certain angle between the one side and the other side of the each of the elastic stoppers, the ones side of the each of the elastic stoppers being a free end.

ADVANTAGEOUS EFFECTS

According to the embodiments of the present invention, a plurality of fixing pieces is formed inside a cover of the vacuum suction device, a plurality of elastic stoppers having a certain curved surface is formed in a height adjustment member in order for each of the fixing pieces to slide and move to be hung to be fixed, each of the fixing pieces slides and moves along a curved surface of the elastic stopper with each of the fixing pieces contacting to the curved surface to be hung on one side surface of each of the elastic stoppers when the cover rotates, an outer surface of a suction plate of the vacuum suction device tightly contacts a adhered surface, a center part of the suction plate is lifted, and a vacuum-applied state is formed between the adhered surface and the suction plate, and thus, the suction force of the vacuum suction device is enhanced and the suction plate of the vacuum suction device is securely adhered to the adhered surface.

Moreover, according to the embodiments of the present invention, a spring used in a related art vacuum suction device is removed, a plurality of elastic stoppers are molded when a height adjustment member is being molded, and thus, the number of components configuring the vacuum suction device may decrease, and an assembly of each of elements configuring the vacuum suction device may be easily performed, whereupon an assembling work between each of the elements configuring the vacuum suction device, a work efficiency and productivity may be enhanced, thereby a manufacturing cost of manufacturing the vacuum suction device being saved maximally.

Also, according to the embodiments of the present invention, each of the elastic stoppers is molded to be manufactured integrally with a height adjustment member and protected from an outer shock by a cover, and thus, damage and breakage are avoided, thereby the vacuum suction device being used semi-permanently.

Moreover, according to the embodiments of the present invention, each of the fixing pieces formed in the cover of the vacuum suction device moves along the curved surface of each of the elastic stoppers to be hung on a bent surface to be fixed, and each of stop protrusion parts of the cover moves along an inclined surface formed in a side plate of the height adjustment member to be inserted into each of fixing groove parts to be hung to form a double lock structure. Therefore, a suction plate of the vacuum suction device is solidly adhered to a adhered surface, and thus, the vacuum suction device is solidly adhered to the adhered surface, and if the cover of the vacuum suction device is not rotated forcibly in an opposite direction, a fixing state is not easily released by an outer shock because each element of the double lock structure is hung on each other, thereby the suction plate being efficiently prevented from being separated from the adhered surface.

Moreover, according to the embodiments of the present invention, if the cover of the vacuum suction device is rotated backward forcibly, a double lock structure is released, and thus, a function of a conventional spring of automatically returning to an original position is maintained.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODES FOR CARRYING OUT THE INVENTION

Reference will now be made in detail to the exemplary embodiments of the present invention, examples of which are illustrated in the accompanying drawings. Wherever possible, the same reference numbers will be used throughout the drawings to refer to the same or like parts. Hereinafter, the vacuum suction device according to the embodiments of the present invention will be described in detail with reference to FIGS. 1 to 9.

The vacuum suction device 100 according to the present invention is adhered to an adhered surface (a), that is, a smooth surface or a flat surface such as a glass or tile by means of vacuum suction in order for a towel or toilet paper to be hung on the adhered surface.

Figure 1:
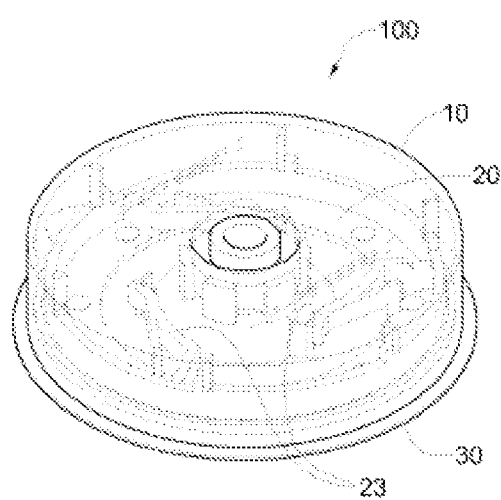
FIG. 1 is a perspective view illustrating a configuration of a vacuum suction device according to a present invention.
Figure 2:
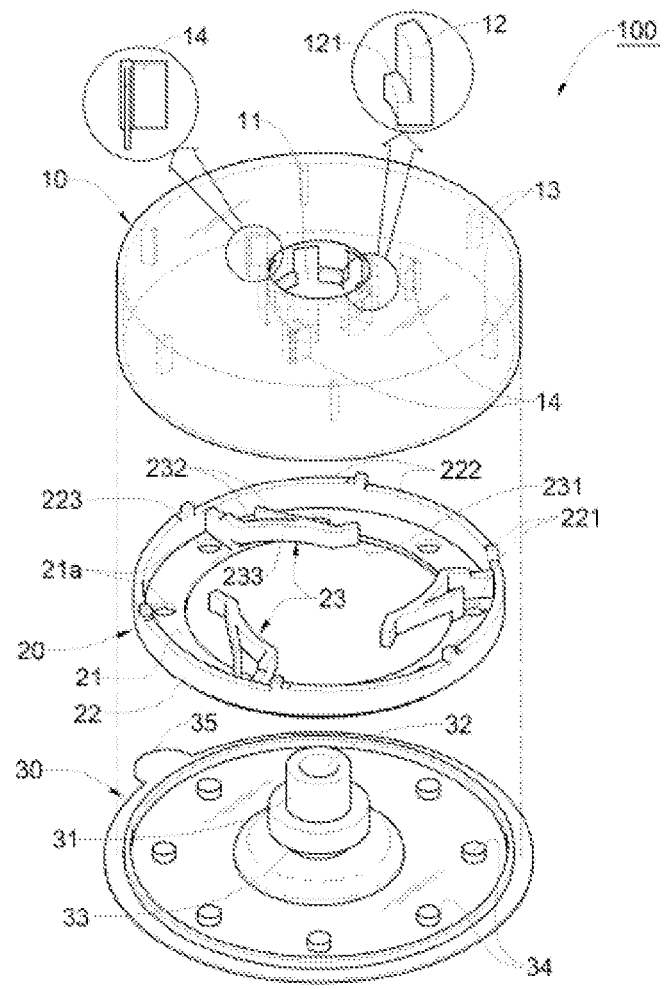
FIG. 2 is an exploded perspective view illustrating a disassembled vacuum suction device according to the present invention.
Figure 3:
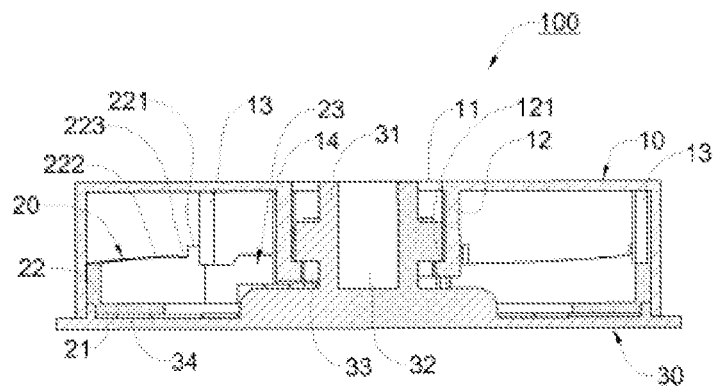
FIG. 3 is a sectional view illustrating a longitudinally-sectioned vacuum suction device according to the present invention.

The vacuum suction device 100, as shown in FIGS. 1 to 3, includes a cover 10 which is rotatably mounted on the upper portion, a suction plate 30 which is coupled to the inside of the lower portion of the cover 10 to be adhered to the adhered surface (a) by vacuum suction in order for the cover 10 to be adhered to the adhered surface (a), and a height adjustment member 20 which is coupled to the inside of the lower portion of the cover 10, is arranged between the cover 10 and the suction plate 30 to move back and forth to the adhered surface (a) according to the rotation of the cover 10, and makes the suction plate 30 adhered to the adhered surface (a) by vacuum suction and be separated from the adhered surface.

As shown in FIGS. 1 and 2, an insert hole 11, into which one end of a hanging member (not shown) is inserted formed in a center part of the cover 10 to penetrate the cover 10.

A plurality of rotation protrusion parts 12 are radially formed to protrude with respect to the insert hole 11 in a position, which is an inner surface of the cover 10 and is external to the insert hole 11, in order for the cover 10 and the suction plate 30 to be coupled, and a hook 121, which is inserted into a stop groove part described below of the suction plate 30, is formed in an end portion of each of the rotation protrusion part 12.

A plurality of stop protrusion parts 13, which moves along a top surface of a side plate 22 of a height adjustment member 20 described below, is inserted into a fixing groove part 223 to be fixed with the stop protrusion parts 13 being in contact with a stopper 221, and limits a range of rotation of the cover 10, are formed to protrude in an inner circumference of the cover 10.

A plurality of fixing pieces 14, the number of which is equal to that of an elastic stopper 23 described below, is formed in a top surface of inside the cover 10 to penetrate downward.

Each of the fixing pieces 14, as shown in FIG. 2, is bent to be formed into a 'V' shape, and a bent outer surface of each of the fixing pieces 14 is formed into a round shape in order to widen a contact area with a curved surface 233 of an elastic stopper 23 described below and in order for the fixing piece 14 to move smoothly by sliding along the curved surface 233.

As shown in FIGS. 2 and 3, the height adjustment member 20 includes a ring-shaped bottom plate 21 formed in a lower portion of the height adjustment member 20, and a side plate 22 formed in a top surface outside the bottom plate 21.

A plurality of coupling holes 21a, into which each of coupling protrusions 34 of the suction plate 30 described below is inserted to be fixed, are formed in the bottom plate 21 in order for the height adjustment member 20 and the suction plate 30 to be coupled.

A plurality of stoppers 221, which contact each of the stop protrusion parts 13 of the cover 10, are formed to protrude in a top surface of the side plate 22 in order for the cover to rotate within a certain range. An inclined surface 222, which is inclined at a certain angle and which a bottom surface of the stop protrusion part 13 contacts, is formed between the stoppers 221 in order for each of the protrusion part 13 to slide to push the height adjustment member 20 to the suction plate 30. Also, a fixing groove part 223, into which a bottom surface of the each of the stop protrusion part 13 sliding along each of the inclined surface 222 to contact one side of the each of the stoppers 221 is inserted to be fixed, is formed in one end portion of the inclined surface 222.

The inclined surface 222 progressively inclined upward from one side to the other side at a certain angle in order for the suction plate 30 to be adhered to the adhered surface (a) or to be separated from the adhered surface (a) when the height adjustment member 20 is pulling the suction plate 30 coupled to the cover toward a center shaft 31 and thus a center part of the suction plate 30 is being lifted.

Here, a plurality of elastic stoppers 23, each of which has a certain elastic force, contacts each of the fixing piece 14 of the cover 10, and makes each of the fixing pieces 14 move by sliding with the fixing piece 14 contacting the elastic stopper 23, are coupled to inside the height adjustment member 20 such that the cover 10 rotates backward, that is, each of the fixing piece 14 moving by sliding so as to fix the cover 10 are respectively hung on an end portion.

As shown in FIGS. 2 and 3, a one end portion of each of the elastic stoppers 23 is formed into a free end, and the other end portion of each of the elastic stoppers 23 is coupled to the bottom plate 21 as well as the side plate 22 of the height adjustment member 20 so as to be solidly coupled to the height adjustment member 20.

That is, a bent surface 231 bent at a certain angle is formed in one side of the each of the elastic stopper 23 in order for each of the fixing pieces 14 of the cover 10 to be hung to be fixed, the fixing piece 14 making the outer side of the suction plate 30 tightly contact the adhered surface (a) by adjusting a height of the height adjustment member 20 and rotating in order for the suction plate 30 of the vacuum suction device 100 to be adhered to the adhered surface (a) by lifting the center part of the suction plate 30 to form a vacuum-applied state. Also, a coupling surface 232, which is coupled to the bottom plate 21 as well as the side plate 22 in order for the coupling force between the height adjustment member 20 and each of the elastic stoppers 23 to increase, and which may be one or may be formed in plurality, is formed in the other side of each of the elastic stoppers 23.

Moreover, a curved surface 233 is formed to be curved at a certain angle between one side and the other side of the elastic stopper 23, that is, the bent surface 231 and the coupling surface 232, such that the each of the fixing pieces 14 moves by sliding with the piece 14 contacting the curved surface 232 in order for each of the elastic stoppers 23 to return to an original position if the each of the fixing pieces 14 located at the bent surface 231 after each of the elastic stoppers 23 having certain elasticity is pushed outward by each of the fixing pieces 14.

As shown in FIGS. 2 and 3, a center shaft 31 is formed in a top surface of a center part of the suction plate 30 to stand widthwise, and a coupling groove 32, into which one end of the hanging member is inserted in order for the hanging member to be coupled to the center shaft 31 by a hot melting method, an ultrasonic waves melting method or the like, is formed in the center shaft 31.

A stop groove part 33, which makes a hook 121 formed in end portion of each of the rotation protrusion pars 12 of the cover 10 be inserted into the stop groove part 33 to be fixed, is formed in a certain position of an outer circumference of the center shaft 31 along the outer circumference.

A plurality of coupling protrusions 34 each of which is inserted into the each of the coupling hole 21a so as to connect the height adjustment member 20 to the suction plate 30 to couple them, are formed in a top surface of the suction plate 30, and a holding part 35, which makes the suction plate 30 adhered to the adhered surface be separated from the adhered surface (a), is formed in an outer circumference.

An operating method of the present invention described above will be provided below.

First, when the height adjustment member 20 is being located at the top of the suction plate 30, each of the coupling protrusions 34 of the suction plate 30 is inserted into each of the coupling hole 21a formed in a bottom plate 21 of the height adjustment member 20, and thus, the height adjustment member 20 and the suction plate 30 are coupled.

Sequentially, when the suction plate 30, to which the height adjustment member 20 is coupled, is being located under the cover 10, the hook 121 respectively formed in end portion of the each of the rotation protrusion 12 of the cover 10 is respectively inserted into the stop groove part 33 formed in an outer circumference, and thus, the suction plate 30 is coupled to the cover 10, thereby a process of making the vacuum suction device 100 being completed.

At this point, a bottom surface of each of the stop protrusion parts 13 of the cover 10 contacts the inclined surface 222 formed in the side plate 22 of the height adjustment member 20, and each of the fixing pieces 14 of the cover 10 contacts the curved surface 233 of each of the elastic stoppers 23 coupled to the height adjustment member 20.

Also, one end portion of the hanging member (not shown), on which various objects such as a towel, toilet paper are hung, is inserted into the coupling groove 32 formed in the center shaft 31 of the suction plate 30, and then, the hanging member is coupled to the center shaft 31.

Figure 4:
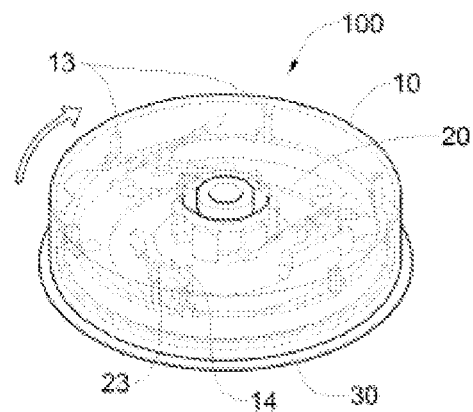
FIGS. 4 and 5 are exemplary diagrams illustrating an operation of the vacuum suction device according to the present invention.
Figure 6:
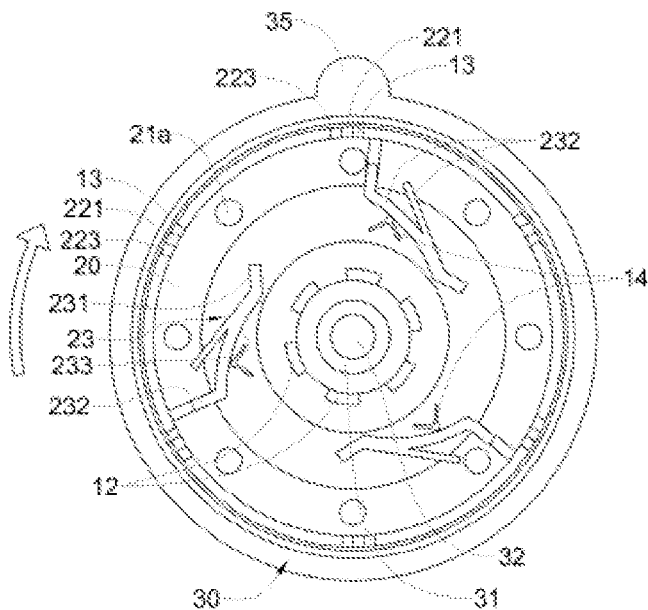
FIGS. 6 and 7 are plan views illustrating an operation of a vacuum suction device according to the present invention.
Figure 8:
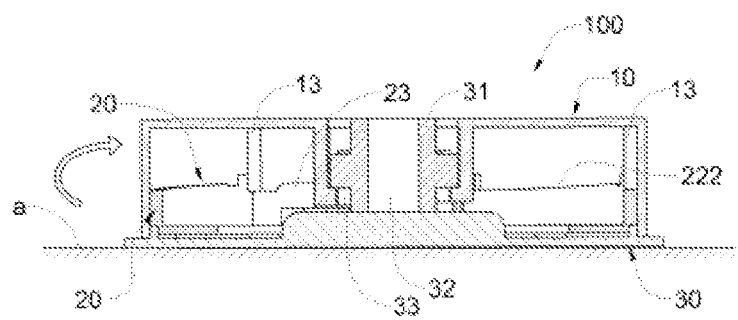
FIG. 8 is a sectional view illustrating a vacuum suction device according to the present invention before a suction plate is adhered to a adhered surface.

At an initial state of the completed order of the vacuum suction device 100, the vacuum suction device is located as shown in FIGS. 4 and 6, and then, the vacuum suction device is adhered to the adhered surface (a) to be coupled to the adhered surface after the vacuum suction device 100 is located at the adhered surface (a) as shown in FIG. 8.

A process of adhering the vacuum suction device to the adhered surface to couple the vacuum suction device to the adhered surface will be described below. If the cover 10 of the vacuum suction device 100 is rotated clockwise as shown in FIGS. 4 and 6, each of the stop protrusion parts 13 moves along the inclined surface 222 formed in the top surface of the side plate 22 of the height adjustment member 20 by sliding, and because each of the stop protrusion parts 13 move only between the stoppers 221 formed in each side of the inclined surface 222, a range of rotation of the cover 10 is limited between the stoppers 221.

At the same time, each of the fixing pieces 14 of the cover 10 moves by sliding along the curved surface 233 formed between the bent surface 231 and the coupling surface 232 of the elastic stopper 23, which is coupled to the bottom plate 21 and the side plate 22 of the height adjustment member 20, and therefore, the cover 10 is progressively separated from the adhered surface (a).

Sequentially, a lower portion of each of the stop protrusion parts 13 is inserted into the fixing groove part 223, and if each of the fixing pieces 14 is located at the position of the bent surface 231 of the elastic stopper 23 to be hung, an outer surface of the suction plate 30 is pushed toward the adhered surface (a) by the height adjustment member 20.

Therefore, the outer surface of the suction plate 30 tightly contacts the adhered surface (a), and at the same time, the cover 10 is separated from the adhered surface by a step height of the inclined surface 222 formed in the height adjustment member 20, and thus, the center part of the suction plate 30 coupled to the cover 10 is lifted and the space between the center part of the suction plate 30 and the adhered surface (a) is separated at a certain interval, thereby a vacuum-applied state being formed and the vacuum-applied state being maintained.

Figure 9:
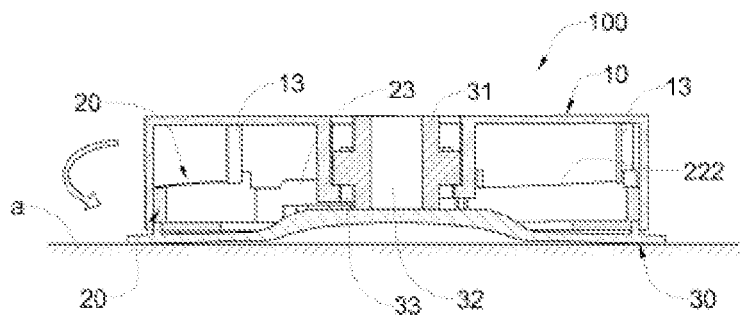
FIG. 9 is a sectional view illustrating a vacuum suction device according to the present invention after the suction plate is adhered to the adhered surface.

Therefore, a strong suction force is maintained between the adhered surface (a) and the suction plate 30, whereupon the suction plate 30 is sucked by vacuum to the adhered surface (a), and thus, the vacuum suction device 100 is adhered to the adhered surface as shown in FIG. 9, and therefore, various objects such as a towel or toilet paper can be hung on the hanging member coupled to the vacuum suction device 100.

Figure 5:
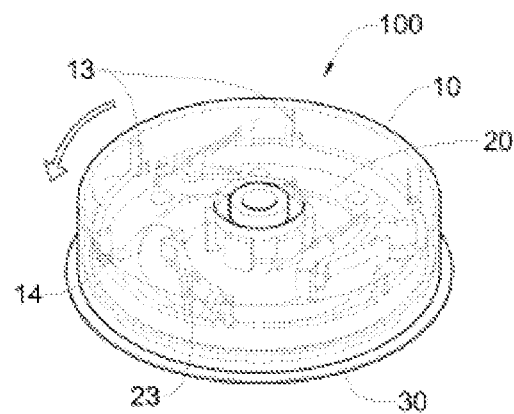
Figure 7:
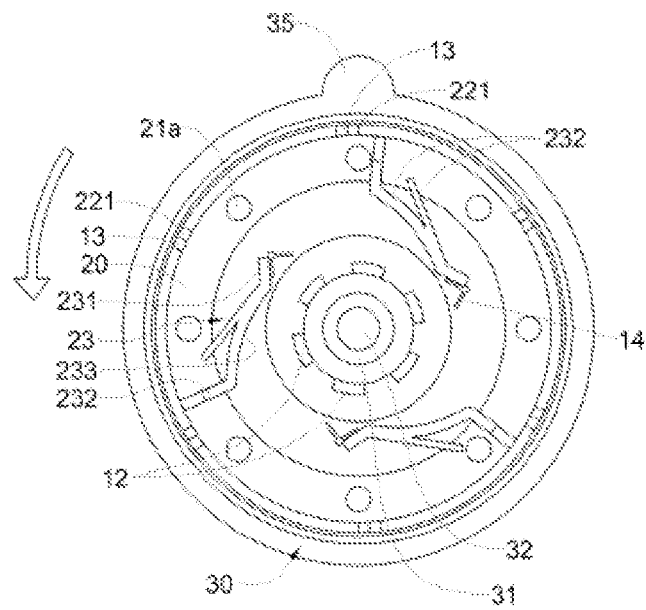

Moreover, if a separation of the vacuum suction device 100 from the adhered surface (a) is wanted, each of the stop protrusion parts 13 is separated from each of the fixing groove parts 223 of the inclined surface 222 formed in the side plate 22 of the height adjustment member 20 by rotating the cover 10 counterclockwise as shown in FIGS. 5 and 7, and at the same time, each of the fixing pieces 14, which is hung on the bent surface 231 of each of the elastic stoppers 23 to be fixed, is separated from the bent surface 231.

At this point, if each of the fixing pieces 14 is separated from each of the bent surfaces 231 of the elastic stopper 23, each of the fixing pieces 14 automatically moves to a position of an initial assembling state by an elastic restoring force of the elastic stopper 23, and thus, the cover 10 returns to an initial position, that is, an original position. That is, a lower portion of each of the stop protrusion parts 13 is separated from each of the fixing groove parts 223 by the cover 10 rotating to move along the inclined surface 222 by the elastic restoring force to the initial point, and at the same time, each of the fixing pieces 14 hung on the bent surface 231 of each of the elastic stoppers 23 is separated from the bent surface 231 to automatically move along the curved surface 233 to an initial position.

Therefore, when the fixing piece 14 of the cover 10 is returning to an initial position, that is, an original position by the elastic restoring force of the elastic stopper 23 of the height adjustment member 20, the center part of the suction plate 30 coupled to the cover 10 moves toward the adhered surface (a), and thus, the vacuum-applied state between the suction plate 30 sucked by vacuum and the adhered surface (a) is released, that is, the center of the suction plate 30 is flattened as shown in FIG. 8, and thus, the vacuum-applied state is released.

At this state, if the holding part 35 of the suction plate 30 is pulled, external air comes into a space between the suction plate 30 and the adhered surface (a), and thus, the suction plate 30 sucked by vacuum to be adhered the adhered surface (a) is separated from the suction plate 30, thereby the vacuum suction device 100 being separated from the adhered surface (a).

As described above, if the cover 10 of the vacuum suction device 100 is rotated in clockwise direction and in counter-clockwise direction of the figure, the center part of the suction plate 30 coupled to the cover 10 by the stop protrusion part 13, the inclined surface 222, the fixing piece 14 and the elastic stopper 23 moves upward and downward with the respect to the adhered surface (a), and thus, the suction plate 20 is sucked by vacuum to be adhered to and is separated from the adhered surface (a), whereupon the vacuum suction device 100 is adhered to and is separated from a smooth surface or a flat surface such as a glass or a tile, that is, the adhered surface (a).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A vacuum suction device comprising:
   a cover which is rotatable mounted on an upper portion of a height adjustment member so as to be coupled to a flat surface by vacuum suction:
   a suction plate which is coupled to a lower portion of the cover to be sucked by vacuum to the flat surface; and
   wherein the height adjustment member is arranged between the cover and the suction plate to move the suction plate upwards and downwards according to the rotation of the cover,
   wherein a plurality of fixing pieces are formed in a top surface of inside the cover, and a plurality of elastic stoppers having a certain elastic force are coupled to inside the height adjustment member in order for the each of the fixing pieces to move by sliding with the fixing piece contacting the elastic stopper and in order for the each of the fixing pieces to be hung on an end portion to fix the cover so as to prevent a backward rotation of the cover from occurring,
   wherein an insert hole formed in an upper portion of the cover into which one end of a hanging member is capable of being inserted into the insert hole, a plurality of rotation protrusion parts including a hook are formed in an inner surface of the cover and project into the insert hole, to be bent toward the insert hole, are radially formed to protrude, and a plurality of stop protrusion parts are formed to protrude in an inner circumference of the cover.

2. The vacuum suction device of claim 1. wherein each of the fixing pieces of the cover is bent to be formed into a 'V' shape, and a bent outer surface of each of the fixing pieces is formed into a round shape.

3. The vacuum suction device of claim 1, wherein one coupling surface or a plurality of coupling surfaces are formed in other side of the each of the elastic stoppers, a bent surface is formed in one side of the each of the elastic stoppers in order for the each of the fixing pieces to be hung on the bent surface to be fixed, and a curved surface, which the each of the fixing pieces contact to slide, is formed to be curved at a certain angle between the one side and the other side of the each of the elastic stoppers, the one side of the each of the elastic stoppers being a free end.

4. The vacuum suction device of claim 1, wherein each of the elastic stoppers are coupled to an inside the height adjustment member, and the each of the fixing pieces of the cover are hung, on end portions of each of the elastic stoppers to temporarily fix the cover when the fixing pieces of the cover is moving by sliding with the each of the fixing pieces contacting the each of the elastic stoppers.

5. The vacuum suction device of claim , wherein a bottom plate including a plurality of coupling holes are formed in a lower portion of the height adjustment member, and a side plate is formed on a top surface outside the bottom plate 21 the side plate comprising a plurality of stoppers which are formed to contact each stop protrusion part of the cover in order to protrude in order for the cover to rotate within a certain range, a inclined surface which is formed between the each of the stoppers and which is inclined at a certain angle in order for a bottom surface of the each of the stop protrusion parts to contact the inclined surface and to move by sliding, and a fixing groove part which is formed in one end portion of the each of the inclined surface and to which the each of the stop protrusion parts is temporarily fixed.

6. The vacuum suction device of claim 1, wherein a center shaft having a coupling groove, into which one side of a hanging member is capable of being inserted into the couplinggroove to be coupled, is formed in a top surface of a center part of the suction plate in order for the suction plate to be coupled to a lower portion of the cover, a stop groove part, into which a hook of the each of a rotation protrusion part is inserted to be coupled, is formed in an outer circumference of the center shaft, and a plurality of coupling protrusions, which are respectively inserted into a corresponding plurality of coupling holes, are formed in the suction plate.

\* \* \* \* \*